(12) United States Patent
Good et al.

(10) Patent No.: US 10,606,957 B1
(45) Date of Patent: Mar. 31, 2020

(54) METHOD AND SYSTEM FOR TRANSLATING NATURAL LANGUAGE POLICY TO LOGICAL ACCESS CONTROL POLICY

(71) Applicant: Raivana, Inc., Vienna, VA (US)

(72) Inventors: Michael Good, Vienna, VA (US); Benjamin Coffinberger, Reston, VA (US)

(73) Assignee: Raivana, Inc., Vienna, VA (US)

( * ) Notice: Subject to any disclaimer, the term of this patent is extended or adjusted under 35 U.S.C. 154(b) by 0 days.

(21) Appl. No.: 16/455,464

(22) Filed: Jun. 27, 2019

(51) Int. Cl.
*G06F 17/27* (2006.01)
*G06F 8/41* (2018.01)
*G06F 17/28* (2006.01)

(52) U.S. Cl.
CPC ............ *G06F 17/2785* (2013.01); *G06F 8/42* (2013.01); *G06F 17/278* (2013.01); *G06F 17/2872* (2013.01)

(58) Field of Classification Search
CPC ..................................................... G06F 17/27
USPC .......................... 704/1, 9, 10, 257, 270–275
See application file for complete search history.

(56) References Cited

U.S. PATENT DOCUMENTS

| 8,532,978 B1* | 9/2013 | Turner ................... G06F 17/271 704/10 |
| 2003/0131001 A1* | 7/2003 | Matsuo ................... G06F 21/34 |
| 2009/0292930 A1* | 11/2009 | Marano ............... G06F 21/6218 713/189 |
| 2010/0318398 A1* | 12/2010 | Brun .................... G06F 17/2775 705/7.18 |
| 2014/0163967 A1* | 6/2014 | Aratsu .................... G06F 17/27 704/9 |
| 2015/0142718 A1* | 5/2015 | Bostick .................. G06N 5/025 706/47 |

OTHER PUBLICATIONS

Ferraiolo et al. "Extensible Access Control Markup Language and Next Generation Access Control". Proc. 2016 ACM International Workshop on Attribute Based Access Control, pp. 13-24 (Year: 2016).*

* cited by examiner

*Primary Examiner* — Jesse S Pullias (74) *Attorney, Agent, or Firm* — Cognition IP, P.C.; Bryant Lee (57) ABSTRACT

Natural language policy text is translated into logical access control policy code with a policy composer that receives natural language policy text, an attribute dictionary connected to the policy composer to define attributes and their logical access control policy equivalents. A natural language policy set is connected to the policy composer and includes samples of natural language policy rules and their logical access control policy equivalents. The policy composer uses natural language processing, the attribute dictionary and the natural language policy set to translate the natural language policy text into logical access control code.

20 Claims, 9 Drawing Sheets

METHOD AND SYSTEM FOR TRANSLATING NATURAL LANGUAGE POLICY TO LOGICAL ACCESS CONTROL POLICY

FIELD

Provided herein are methods and systems for translating natural language policy text into logical access control policy code.

BACKGROUND

Requirements for stricter protection of data have led to technological advancements in the field of access control that allow us to externalize our access control policies from information systems. In many cases, the individuals who author the information security policies are not the individuals implementing the access control policies in these systems. Non-technical information security professionals write the access control policies in natural language in text processors that hands-on technical cyber security engineers must translate into code that a computer can understand. In other cases, a graphical user interface may be available for the implementation of information security policy. It would be desirable to find a way to automatically translate free-form natural language policy text into logical access control policy code.

SUMMARY

In an embodiment, natural language policy text is translated into logical access control policy code. A policy composer receives natural language policy text. An attribute dictionary communicably connected to the policy composer defines attributes and their logical access control policy equivalents. A natural language policy set communicably connected to the policy composer includes samples of natural language policy rules and their logical access control policy equivalents. The policy composer uses natural language processing, the attribute dictionary and the natural language policy set to translate the natural language policy text into logical access control code.

In some embodiments, the logical access control code are in eXtensible Attribute Markup Language (XACML) or Next Generation Access Control (NGAC) format. The attribute dictionary may be populated with attributes from the natural language policy set or populated by user input.

One embodiment includes translating natural language policy text into logical access control policy code. Natural language policy text is provided to a policy composer. Using natural language processing, a natural language policy rule is generated from the natural language policy text. The natural language policy rule is then compared to sample natural language policy rules that are found in a natural language policy set. Attributes are identified in the natural language policy rule using an attribute dictionary. The sample natural language policy rule is then populated with the determined attributes. If the populated sample natural language policy rule is well-formed, The populated sample natural language policy rule is translated into logical access control code and the logical access control code is stored in a policy archive.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, such as a process, an apparatus, a system, a device, or a method on a tangible computer-readable medium.

Components, or modules, shown in diagrams are illustrative of embodiments of the invention. It shall also be understood that throughout this disclosure that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "an embodiment," "some embodiments," or "embodiments" means that a particular feature, structure, characteristic, or function described in connection with the embodiment is included in at least one embodiment of the invention and may be included more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated. Furthermore, the use of memory, database, information base, data store, tables, hardware, and the like may be used herein to refer to system component or components into which information may be entered or otherwise recorded.

Furthermore, it shall be noted that unless otherwise noted: (1) steps may optionally be performed; (2) steps may not be limited to the specific order set forth herein; (3) steps may be performed in different orders; and (4) steps may be done concurrently.

Techniques for natural language policy translation are described herein. In accordance with FIG. 1, a policy translation system 100 for translating natural language policy text into logical access control code is shown. Logical access control code format may be XACML, NGAC or any other suitable logical access control code format. A natural language policy text 102 is collected by the policy translation system 100. The natural language policy text 102 may include a single sentence that defines a policy rule. The natural language policy text 120 may include several sentences, sentence fragments or, indeed, any text that defines one or more policy rules. In one embodiment, the natural language policy text 102 is collected from a variety of different sources, such as from document files (e.g. word processor files), electronic mail, direct text input through a website, and other sources.

Figure 1:
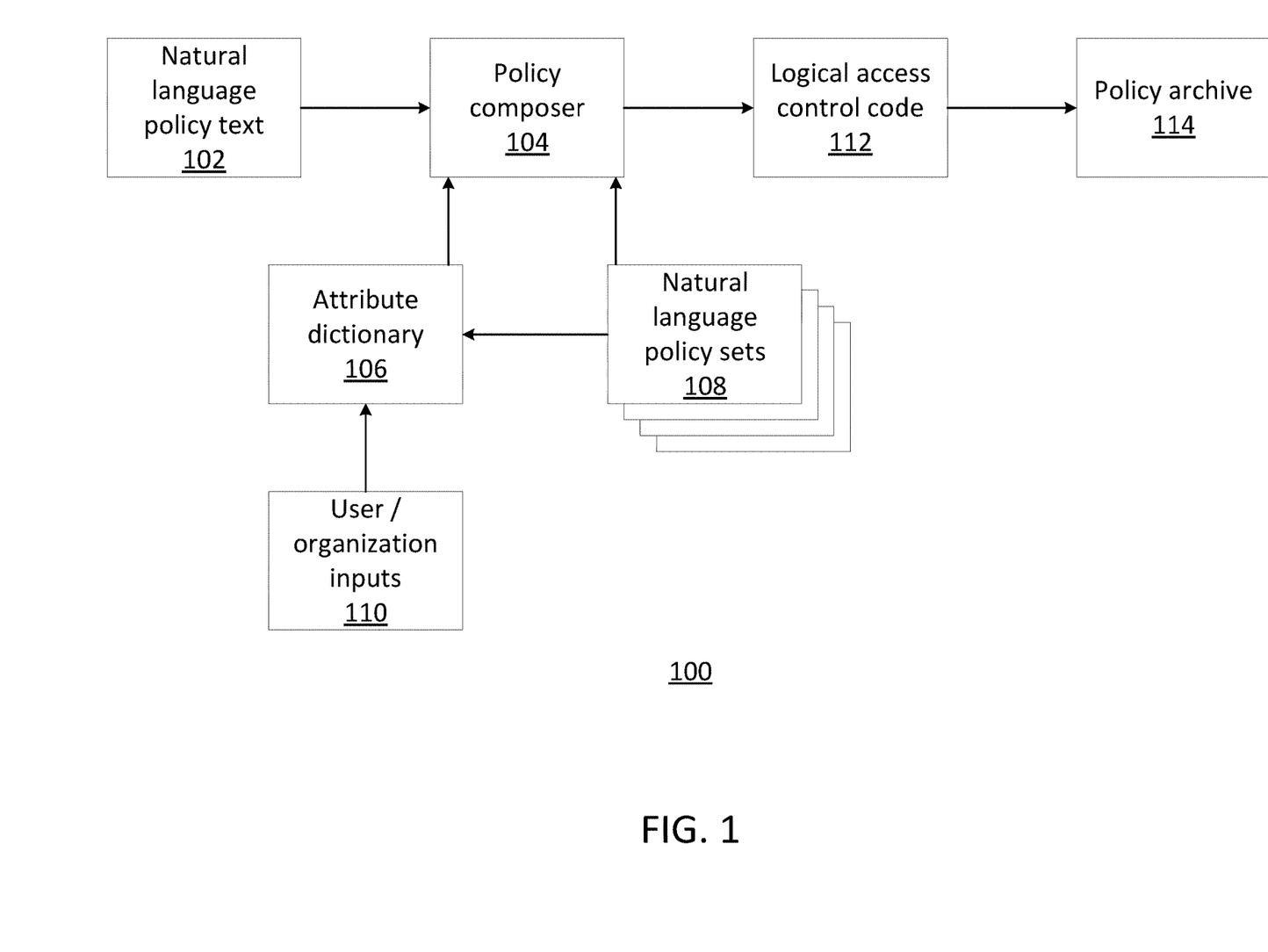
FIG. 1 illustrates a natural language policy text translation system according to an embodiment.

The collected natural language policy text 102 may include natural language that is written in a variety of different ways. In one embodiment, each of the collected policy texts 102 may use different natural language to describe desired access control policies. The natural language policy text may be written in one or more natural languages. The natural language policy rules embedded in the natural language policy text may be written in different forms. For example, the natural language policy rule "Alice may read Bob's files," is equivalent to the natural language policy rule "Bob's files may be read by Alice." Similarly, the same rule may be expressed in English, Japanese, Chinese, Korean or any other natural language.

The natural language policy text 102 is communicated to a policy composer 104. The natural language policy text 102 may be communicated to the policy composer 104 directly, by manual input of text, uploaded as a file or any using other means of communicating text directly. The natural language policy text 102 may be communicated wirelessly to the policy composer 104, through email, messaging or any other means of communicating text indirectly. In one embodiment, natural language policy text 102 may include document files (e.g., word processor files, text-editing files, etc.), direct text input (e.g., via a form on a website), electronic mail, and other natural language policy sources. In one embodiment, the natural language policy text 102 may include policies including text written by one or more individuals.

The policy composer 104 uses an attribute dictionary 106 and natural language policy sets 108 to translate the natural language policy text 102 into logical access control policy code 110. The attribute dictionary 106 is a database that associates words found in a natural language policy text 102 with attributes used in logical access control policy code 110. The attribute dictionary 106 may be created by analyzing data found in the natural language policy sets 108, natural language policy texts 102 or may be attribute data 112 input by the user, other users, organizations or other sources. The policy translation system 100 maintains an attribute dictionary 106 that is populated based on an analysis of the natural language policy text 102. In one specific example, an uploaded natural language policy text 102 may include text in English associated with English NLP Set 1, text in Chinese associated with Chinese NLP Set 1, text in Japanese associated with Japanese NLP Set 1, and text in in German associated with German NLP Set 1. The attribute dictionary 106 may be populated based on associated words found in the aforementioned natural language policy sets 108 by the analysis done on the text sources. Text analysis performed by the policy composer 104 is used in conjunction with the natural language policy sets 108 to identify the logic used in logical access control policy code 112. The attributes in the attribute dictionary 106 are used in conjunction with the logic determined by the policy composer 104 to create logical access control policy code 112 that can be logically implemented. The resulting logical access control policy code 112 is stored in the policies archive 114, a repository for all created policies.

The policy composer 104 uses one or more natural language policy sets 108 to translate natural language policy texts 102 into logical access policy code 112. The natural language policy sets 108 may include natural language policy sets 108 specific to natural languages such as English, Japanese or any other natural language. In one embodiment, access control policy translation system maintains a number of natural language policy sample sets each associated with a language, such as English NLP (natural language processing) Set 1, Chinese NLP Set 1, Japanese NLP Set 1, and German NLP Set 1, The natural language policy sets 108 may be specific to organizations, branches of organization, departments of organization or any other entity. The policy composer 104 analyzes the natural language policy text 102 and identifies appropriate natural language policy sets 108 for use in translation. For example, a first natural language policy text 102 may includes natural language that checks if an employee resides in a certain branch of their organization may be associated with English Natural Language Policy Sample Set 1, a second natural language policy text 102 that includes natural language that refers to an organizational branch as a department may be associated with English Natural Language Policy Sample Set 2, and a third natural language policy text 102 that is written in Japanese natural language may be associated with Japanese Natural Language Policy Sample Set 1, and so on.

The policy composer 104 receives natural language policy text 102 and uses the attribute dictionary 106 and natural language policy sets 108 to identify possible access control rules (collectively referred to as rules) embedded in the natural language policy text 102

Figure 2:
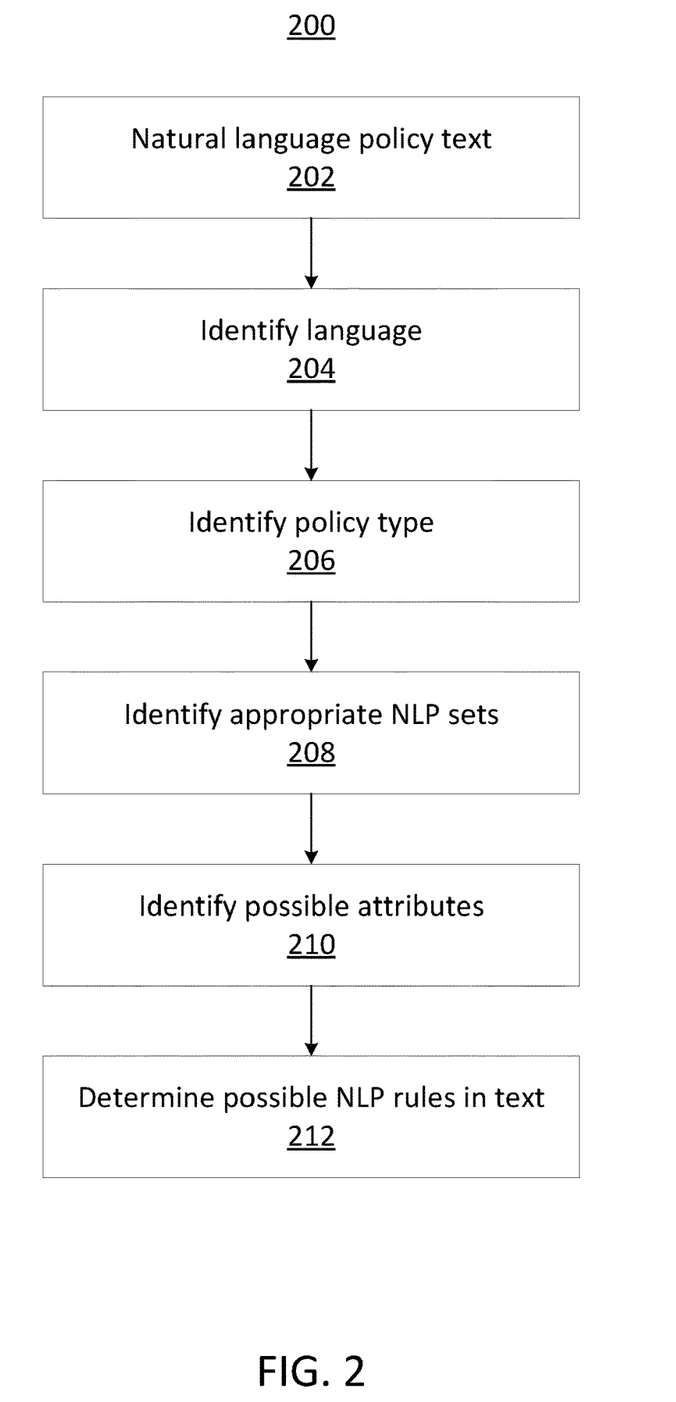
FIG. 2 illustrates a process of identifying natural language policy rules in a natural language policy text in accordance with an embodiment.

With reference to FIG. 2, a method 200 of identifying natural language policy rules is shown. Starting with a natural language policy text 102 in step 202, the policy composer 104 identifies the natural language used in the natural language policy text in step 204. The policy composer 104 identifies the type of policy in the natural language policy text 102 in step 206. With the identified natural language and the policy type, the policy composer identifies the appropriate natural language policy sets 108 in step 208. By comparing the natural policy language text 102, the appropriate natural language policy sets 108, and the attribute dictionary 106, the policy composer 104 identifies the possible attributes present in the natural language policy text 102 in step 210. The policy composer 104 then identifies the possible natural language policy rules in the natural language policy text in step 212.

Figure 3:
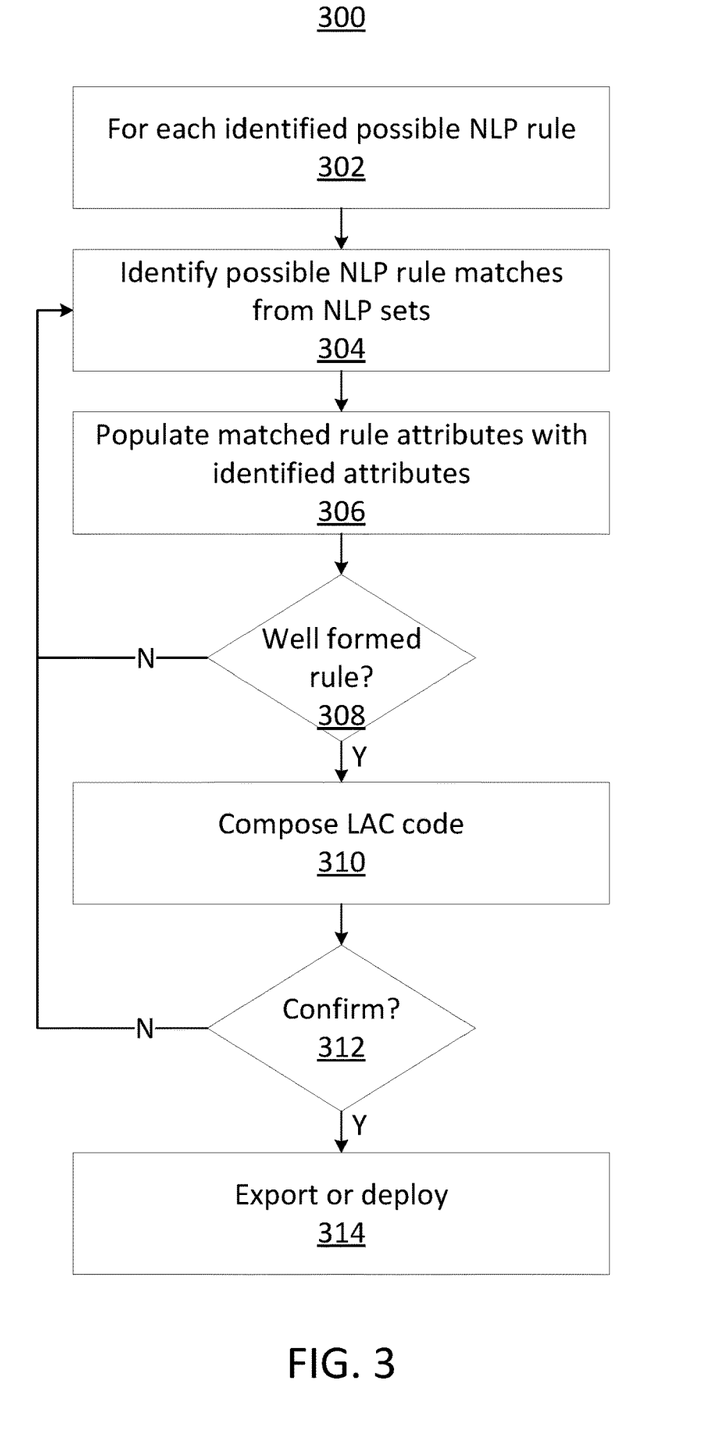
FIG. 3 illustrates a process of translating a natural language policy rule into logical access control code.

With reference to FIG. 3, a method 300 of translating each of the natural language policy rules found in the natural language policy text 102 into logical access control code 112. Taking each identified natural language policy rule in step 302, the policy composer 104 uses the natural language policy sets 108 and identifies possible natural language policy rule matches with natural language rule samples in the natural language rule sets 108. The matched natural language policy rule is then populated with the identified attributes in step 306. The method 300 then determines if the attribute populated natural language policy rule is a well-formed rule in step 308. If the rule is not well formed, the process returns to step 304 and identifies another possible natural language policy rule match. If the rule is well formed, the policy composer 104 generates logical access control code corresponding to the attribute populated natural language policy rule in step 310. The logic and attributes identified are then presented to the user to confirm that the proposed translation is what the user intended in step 312. If the user is dissatisfied with the logical access control code, the method 300 returns to step 304 and makes another attempt to identify possible natural language policy rule matches. If they user is satisfied with the logical access control code, the logical access control code is exported to the policy archive 114 or deployed for use by the policy control system in step 314.

Figure 4:
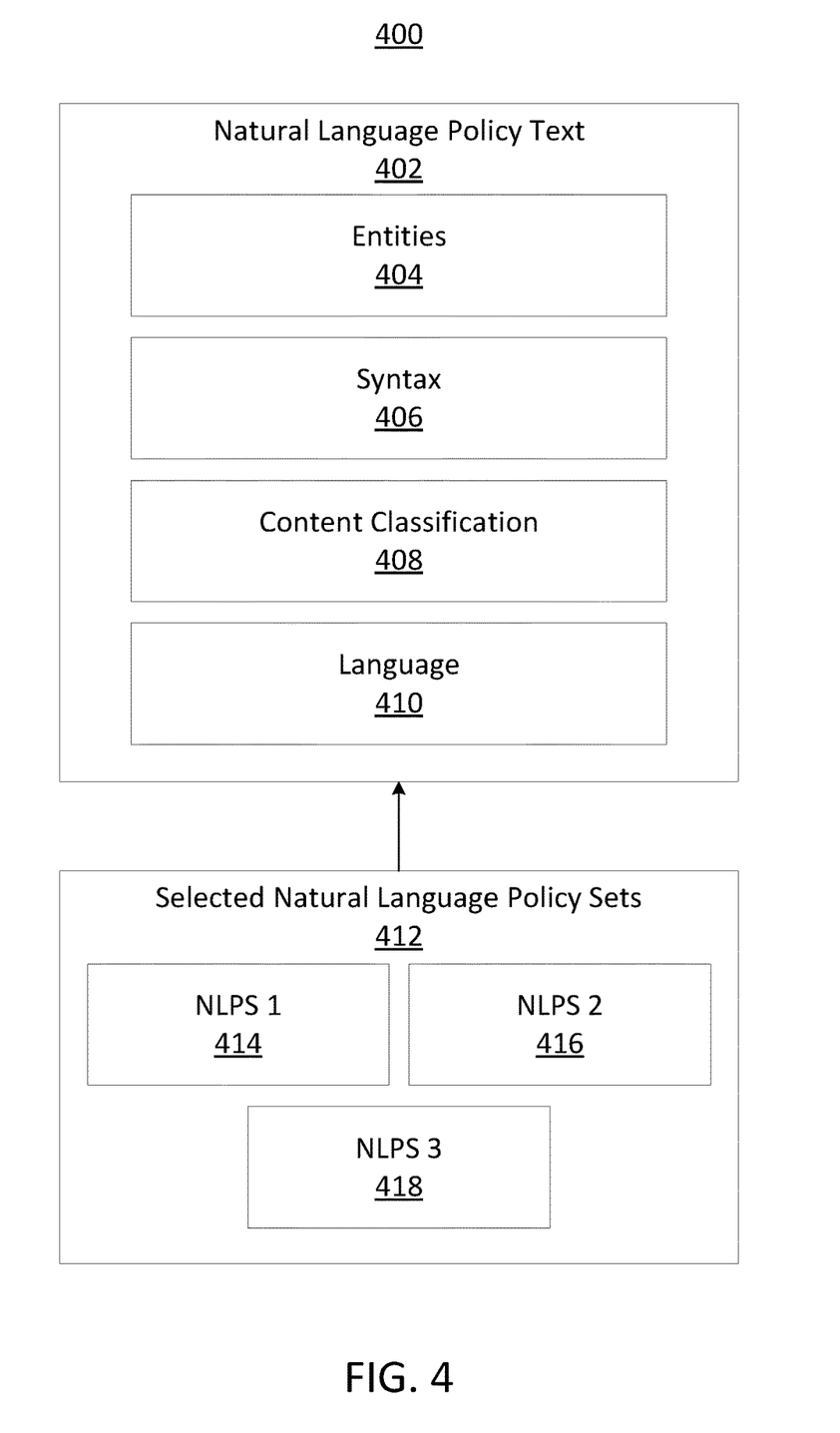
FIG. 4 illustrates the functions of a policy composer according to an embodiment.

Referring to FIG. 4, a system for policy text characteristic analysis 400 will now be described in detail. The policy samples 414, 416, 418 in the identified natural language policy sets 412 may be analyzed to identify various natural language policy text characteristics 404, 406, 408 and 410 associated with the natural language policy texts 402. The natural language policy text 402 includes a variety of natural language policy characteristics, including entities characteristics 404, syntax characteristics 406, content classification characteristics 408, and language characteristics 410. It is noted that the above characteristics are non-limiting examples, and that any number of natural language policy sets 412 may be analyzed to obtain any number of the above or other text characteristics.

In one embodiment, text characteristics of a natural language policy sets 412 may be determined by performing natural language processing (NLP) and/or other processes on the policy samples 414, 416 and 418 and then analyzing output of the NLP or other processes. Additionally, in one embodiment, the analysis of NLP or other processes may include determinations of logic (e.g., greater than or equal to, etc.), combining algorithms (e.g., deny unless permit, etc.), spelling errors, grammatical errors, and invalid input. Attributes of the text characteristics of the policy samples 414, 416 and 418 in a respective natural language policy set 412 may be averaged so as to produce overall text characteristics for the policy type.

Figure 5:
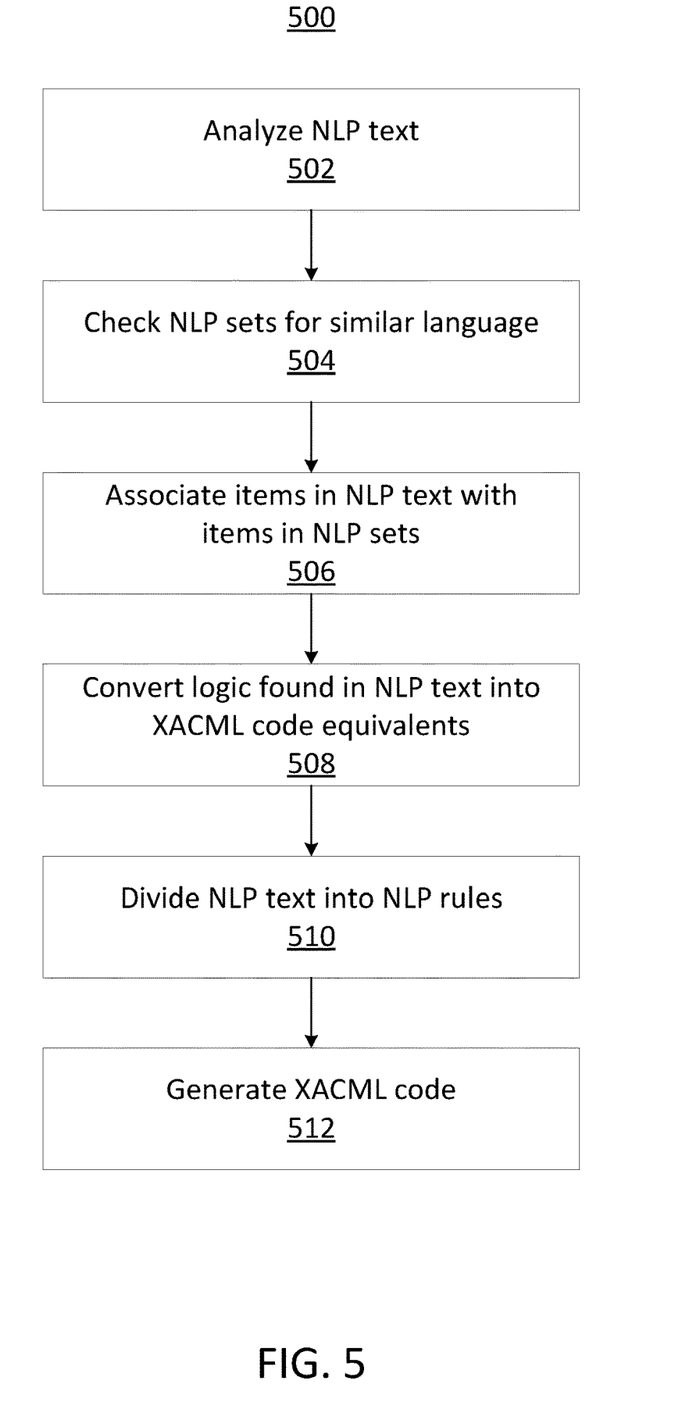
FIG. 5 illustrates a process of translating a natural language policy text into XACML according to an embodiment.

Referring to FIG. 5, the process 500 for identification and translation of natural language policy rules is shown. Once a natural language policy text 102 is input into the policy composer 104, various natural language processing tasks are performed on the text, to include but not be limited to named entity recognition, part-of-speech tagging, lemmatization, and morphological segmentation in step 502. The policy composer 104 then checks the natural language policy sets 108 for the presence of similar items discovered from its prior tasks in step 506. These similar items are discovered based on the metadata per each item.

For example, consider the sentence, "Employees can only access records in their own department." The word, "employees," may be recognized as a named entity in step 502 (the natural language processing tasks) and may have a salience score of 0.67 out 1.00. In step 504—checking policy sample sets for similar items—the policy composer 104 may discover a previously translated policy that used the same word or its singular form based on its characteristics, such as it being a named entity and a salience above a 0.50. In this example and in this embodiment, the previously used word "employee" discovered in the policy sample set was assigned the XAMCL attribute category of "urn:oasis:names:tc:xacml:1.0:subject-category:access-subject," AttributeId of "employee," and DataType of "http://www.w3.org/2001/XMLSchema#string."

Subsequently, the similar items discovered in the Policy Sample Sets are associated with the items in the text in step 506. Continuing the example above, the word "employee" is now assigned the metadata from the word "employee" that was used in a previous translated policy. So, it is now assigned the XACML attribute category of "urn:oasis:names:tc:xacml:1.0:subject-category:access-subject," AttributeId of "employee," and DataType of "http://www.w3.org/2001/XMLSchema#string."

After the associations are complete for items that are not the logical conditions to permit or deny access (e.g. subjects, resources, etc.), then the logical conditions are compared to known logical conditions in the natural language policy sets 508. The match with the strongest confidence score above a specific minimum confidence score is associated with the logical conditions in the text. This association between the logical conditions from the natural language policy sets 108 and the logical conditions in the text also associates specific XACML function(s).

In this embodiment, consider our previously mentioned example. The words, "can only access," would be translated to a "permit" effect. The words, "in their own department," contains a possession modifier ("their") and an adjectival modifier ("own"). These words will trigger the policy composer 508 to create logic in XACML that compare the department of the employee to the department of the record he or she is accessing.

After the logic is translated to XACML, the policy composer now seeks to put the rules into PolicySet and Policy nodes (components of a XACML policy structure) in step 510. It may create PolicySet and/or Policy nodes based on multiple factors, such as proximity in the original provided natural language text and content classification from the prior text analysis. Once these PolicySet and Policy nodes are created, rules are appropriately placed in them.

Subsequently, an XML file in XACML format is created which can be imported into any XACML compliant system in step 512.

It should be appreciated that other items present in a typical XACML file are generated automatically or may be configured with user input.

Figure 6:
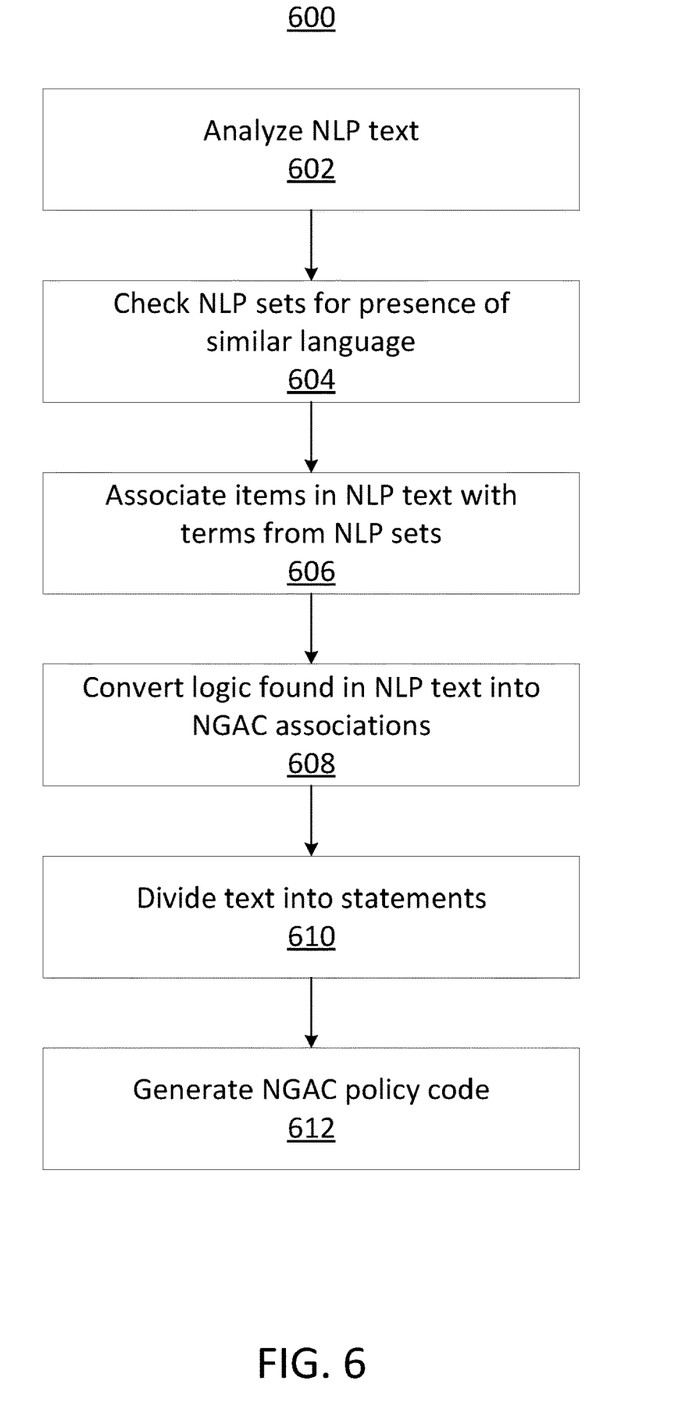
FIG. 6 illustrates a process of translating a natural language policy text into NGAC according to an embodiment.

Referring to FIG. 6, the process 600 used by the policy composer 104 to identify rules in natural language policy text 102 and translate the rules into code compliant with the NGAC standard developed by National Institute of Standards and Technology (NIST).

Once a natural language policy text source 102 is input into the system, the policy composer 104 performs various natural language processing tasks on the text, to include but not be limited to named entity recognition, part-of-speech tagging, lemmatization, and morphological segmentation in step 602. Subsequently, the policy composer 104 communicates with natural language policy sets 108 for presence of similar items discovered from its prior tasks in step 604. These similar items are discovered based on the metadata per each item. The policy composer 104 associates items in the natural language policy text 102 with terms from the natural language policy sets 108 in step 606

For example, consider the sentence used in the previous example, "Employees can only access records in their own department." The word, "employees," may be recognized as a named entity in step 602 (the natural language processing tasks) and may have a salience score of 0.77 out 1.00. In step 604—checking natural language policy sets 108 for similar items—may discover a previously translated policy that used the same word or its singular form based on its characteristics, such as it being a named entity and a salience above a 0.50. In this example and in this embodiment, the previously used word "employee" discovered in the natural language policy set 108 was assigned as a user attribute which entails "read access" on public information. So, the discovered word "employees," in this example, may be assigned with the code to create this employee user attribute, "long employeeID=graph.createNode(new Node(rand.nextLong( ), "Employee", UA, null));" This code effectively creates a user attribute in the NGAC access control graph, a representation of access control policy as a graph.

Additionally, we know that this assigned employee user attribute also had an association with "read" access. The code for this, specifically, looks like this, "graph.associate (new Node(employeeID, UA), new Node(publicID, OA), r);" This code effectively allows users assigned the employee attribute to read public information. As this is associated with the employee attribute, it is now assigned to the newly discovered word "employees" too by the Policy Composer.

This "publicID" that was discovered was a previously used object attribute. It was created with code that looked like this, "long publicID=graph.createNode(new Node(rand.nextLong( ), "Public Info", OA, null));" Take note that one of the parameters says, "Public Info." Based on its discovery, the policy composer 104 will check for similar or related word(s) in the text, if one was not already discovered. When one is discovered it will be used in direct coordination with the employee attribute already described above.

Once all attributes have been discovered (e.g., the user and object attributes) and all associations that assigned that were previously used if relevant, the logic stated in the original natural language policy text 102 will be translated into the assignments and associations used in NGAC in step 608.

The previously used example—the one referring to employees accessing their own records—is already complete, since there were prior policies with similar language. But let's assume there's content in the same input text that is unique. For example, let's assume no prior associations in the natural language policy sets 108 were found for the logic in the sentence, "Alice can read and write her SSN." Let's begin with "read and write her SSN." Object attributes were already created for SSN and read/write access. By creating the assignments and populating their parameters dynamically, we translate the natural language in the text to logical policy, "graph.assign(new Node(aliceSSNID, O), new Node (aliceID, OA)); graph.assign(new Node(aliceSSNID, O), new Node(aliceRWID, OA));" The association occurs for Alice as an individual, "graph.associate(new Node(aliceUAID, UA), new Node(aliceRWID, OA), rw);" As we have illustrated, there have been two paths to converting the text into logic: either by finding the logic through finding strongly related examples in the Policy Sample Sets or by using natural language processing with algorithms to populate it.

As mentioned, code is only complete if it meets a syntactically correct code statement (e.g., meeting the required parameters). The policy composer 104 divides the natural language policy text 104 into code based on whether or not sufficient parameters are present to complete a statement in step 610. The statements are converted from natural text to NGAC policy code by the policy composer 108 and the file is generated as a whole which may be then be used. The NGAC policy code output format may be in a file format such as Java.

It should be appreciated that other items present in a typical NGAC policy are generated automatically or may be configured with user input. The embodiment described above illustrates how the disclosed invention may be used to translate natural language to various kinds of logical access control, as long as the components of entities (known as users in NGAC) requesting access to resources (known as objects in NGAC) exist in the text.

Figure 7:
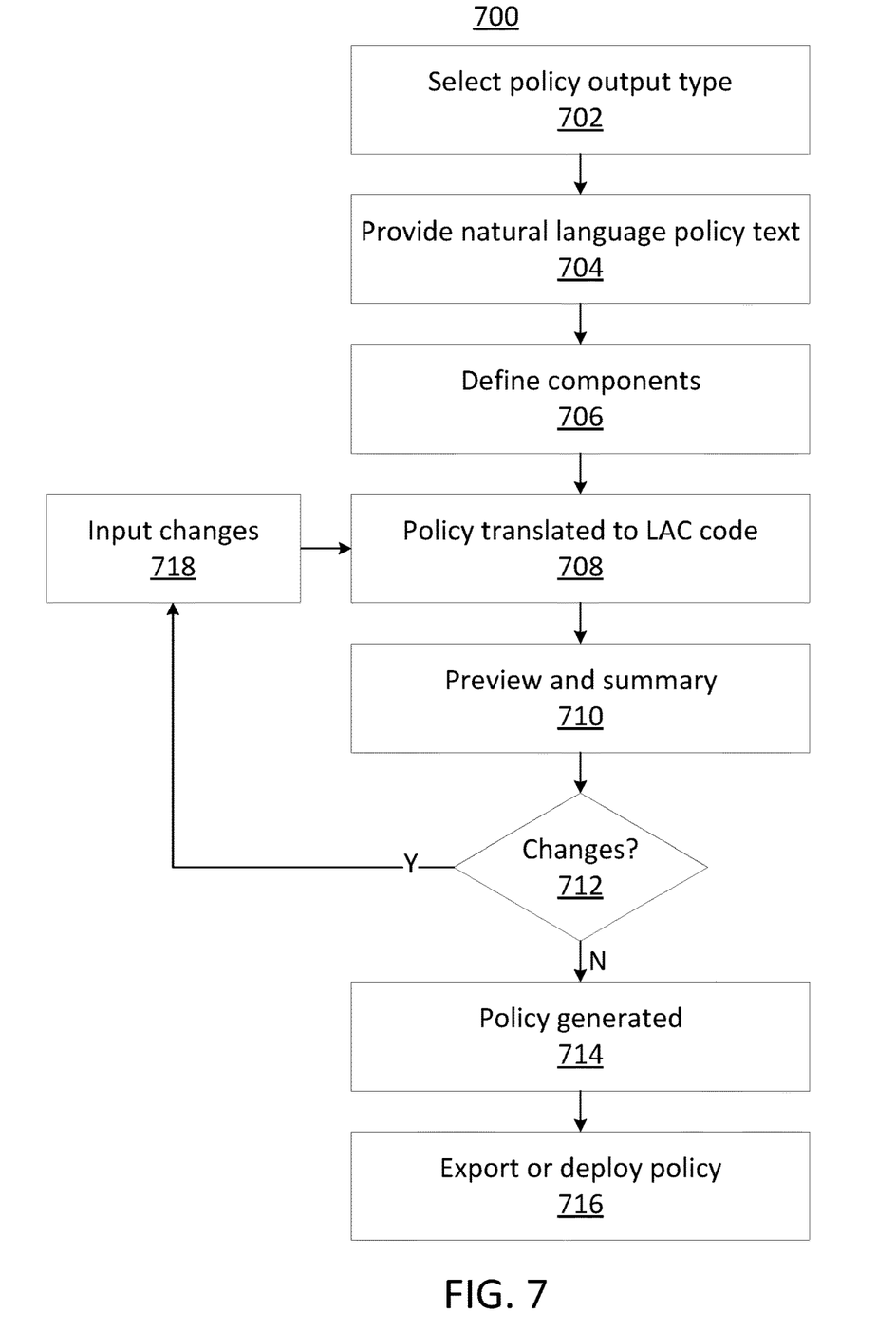
FIG. 7 illustrates a user experience of generating logical access control code according to an embodiment.

With reference to FIG. 7, the user experience 700 is shown. The user may choose what the type of output policy may be, such as XACML or NGAC in step 702. After doing so, the user may choose the source of a natural language policy text 102, such as uploading a text document (e.g. Microsoft Word document) into the application is shown in step 704. After this, the user may choose if he or she wishes to define any components beforehand, such as attributes, although this is not required in step 706. After this, the policy translation system described translates the natural language policy text 102 to the desired output, such as XACML, in step 708. After the translation is complete, the user is displayed with a prompt in this embodiment in step 710. This prompt shows the completed translation (e.g. XACML), a summary of the policy in natural language (e.g., what attributes are defined in XACML and what the rules do), and the ability to select components (e.g., a particular attribute or a rule). If the client decides to make changes in step 712, a selected component (e.g. attribute or rule) may be chosen to be altered or removed in step 718. An additional option shown in the prompt is to scan for additional attributes. Once the user has made their choices, the a new policy is generated in step 708. Once the new policy is generated, the prompt with the options described is shown again at step 712. Once the user chooses not to change anything, the policy is generated in its desired format (e.g. XACML or NGAC) in step 714.

At this time, the policy may be exported or deployed in step 716. Exporting may include downloading the file to an information system. Deployment may include committing the policy file to an access control system for immediate use.

Figure 8:
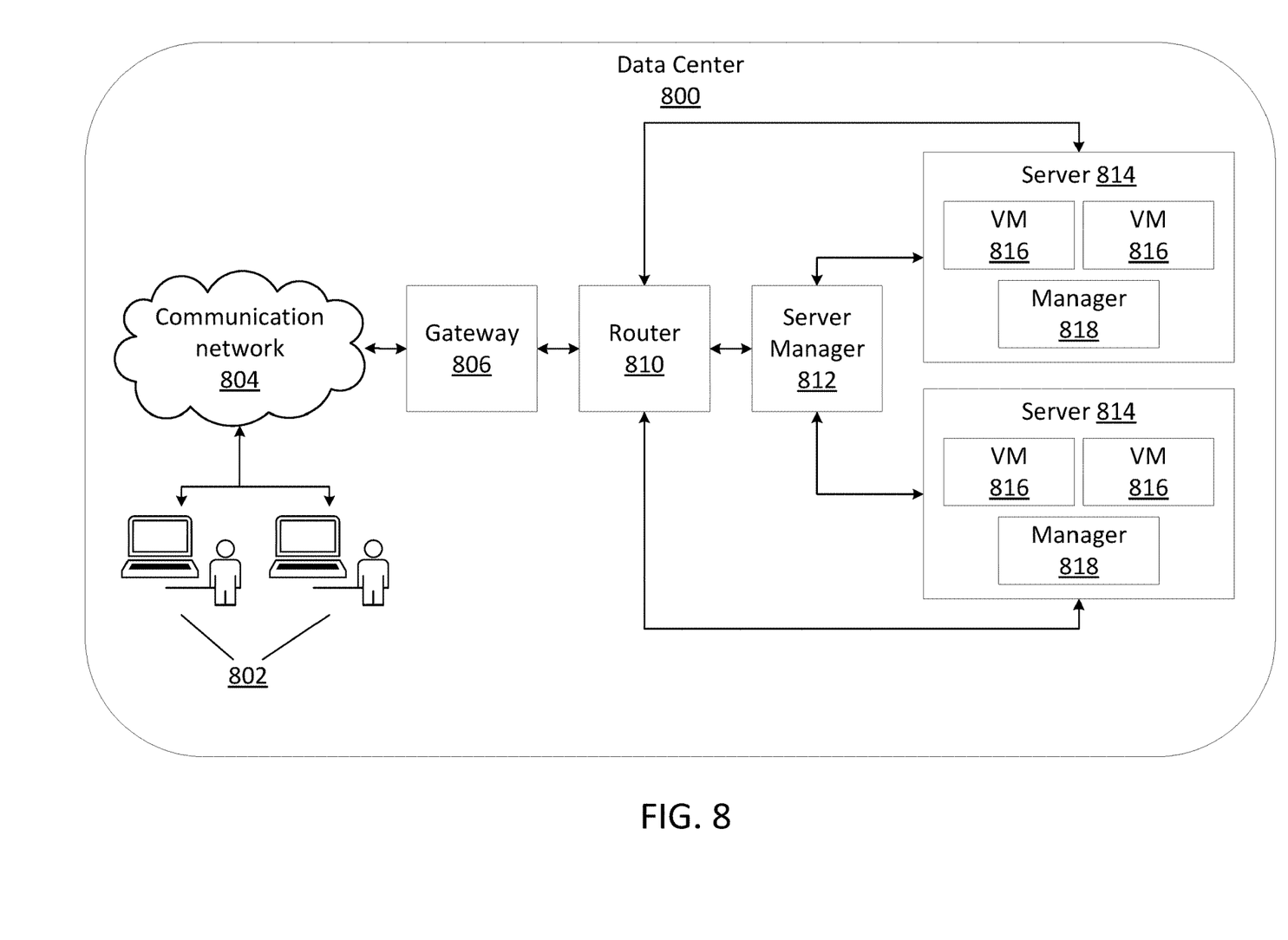
FIG. 8 illustrates a typical data center according to an embodiment.

In accordance with FIG. 8, a representative data center 800 is shown. Users 802 connect using a communication network 804 to a gateway 806. The gateway 806 communicates with a router 810. The router 810 communicates with a server manager 812 and servers 814. The server manager 812 communicates with the servers 814. Each server 814 includes virtual machines 816 and a manager 818.

Figure 9:
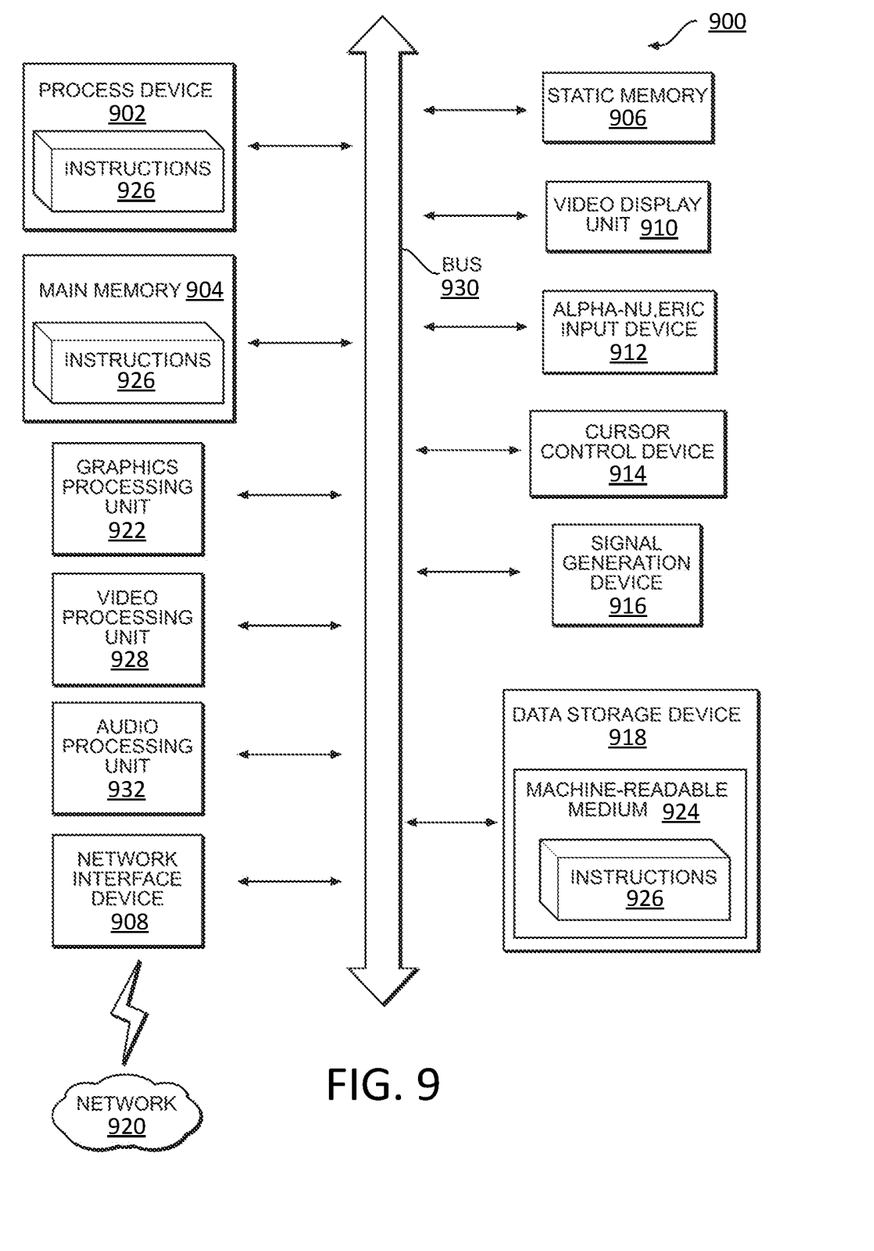
FIG. 9 illustrates an example machine of a computer system according to an embodiment.

FIG. 9 illustrates an example machine of a computer system within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 900 includes a processing device 002, a main memory 904 (e.g., read-only memory (ROM), flash memory, dynamic random access memory (DRAM) such as synchronous DRAM (SDRAM) or Rambus DRAM (RDRAM), etc.), a static memory 906 (e.g., flash memory, static random access memory (SRAM), etc.), and a data storage device 918, which communicate with each other via a bus 930.

Processing device 902 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 1002 may also be one or more special-purpose processing devices such as an application specific integrated circuit (ASIC), a field programmable gate array (FPGA), a digital signal processor (DSP), network processor, or the like. The processing device 1002 is configured to execute instructions 926 for performing the operations and steps discussed herein. In one embodiment, the computer system 900 may use a motherboard with PLX chip to optimize use of PCIe lanes of the motherboard.

The computer system 900 may further include a network interface device 908 to communicate over the network 920. The computer system 900 also may include a video display unit 910 (e.g., a liquid crystal display (LCD) or a cathode ray tube (CRT)), an alphanumeric input device 912 (e.g., a keyboard), a cursor control device 1014 (e.g., a mouse), a graphics processing unit 922, a signal generation device 916 (e.g., a speaker), graphics processing unit 922, video processing unit 928, and audio processing unit 932.

The data storage device 918 may include a machine-readable storage medium 924 (also known as a computer-readable medium) on which is stored one or more sets of instructions or software 926 embodying any one or more of the methodologies or functions described herein. The instructions 926 may also reside, completely or at least partially, within the main memory 904 and/or within the processing device 902 during execution thereof by the computer system 900, the main memory 904 and the processing device 902 also constituting machine-readable storage media.

In one implementation, the instructions 926 include instructions to implement functionality corresponding to the components of a device to perform the disclosure herein. While the machine-readable storage medium 924 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

In general, the terms "engine" and "module", as used herein, refer to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on one or more computer readable media, such as a compact discs, digital video discs, flash drives, or any other tangible media. Such software code may be stored, partially or fully, on a memory device of the executing computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed:

1. A system for translating natural language policy text into logical access control policy code, comprising:
    a policy composer to receive a sequence of free text natural language policy text strings provided by a user;
    an attribute dictionary communicably connected to the policy composer defining attributes and their logical access control policy equivalents; and
    a natural language policy set communicably connected to the policy composer with samples of natural language policy rules and their logical access control policy equivalents;
    wherein the policy composer is configured to use natural language processing to automatically identify a plurality of candidate attributes in the sequence of free text natural language policy text strings and store the candidate attributes in the attribute dictionary;
    wherein the policy composer is configured to identify a plurality of candidate natural language policy rules from the natural language policy set and populate the plurality of candidate natural language policy rules with the candidate attributes to generate a populated rule and evaluate whether the populated rule is a well-formed rule; and
    wherein the policy composer uses the attribute dictionary and the natural language policy set to translate the input natural language policy text strings into logical access control code.

2. The system of claim 1, wherein the logical access control code is in XACML format.

3. The system of claim 1, wherein the logical access control code is in NGAC format.

4. The system of claim 1, wherein the attribute dictionary is populated with attributes from the natural language policy set.

5. The system of claim 1, wherein the attribute dictionary is populated by user input.

6. The system of claim 1, wherein the natural language processing comprises named entity recognition that identifies a named entity that is a string in the input free text natural language policy text strings, wherein a first natural language policy set includes metadata for the named entity from a previously translated policy.

7. The system of claim 1, wherein the natural language processing comprises morphological segmentation.

8. A method for translating natural language policy text into logical access control policy code, comprising:
    receiving a sequence of free text natural language policy text strings input by a user to a policy composer;
    using natural language processing to automatically identify a plurality of candidate attributes in the sequence of free text natural language policy text strings and store the candidate attributes in an attribute dictionary;
    identifying a plurality of candidate natural language policy rules from a natural language policy set;
    populating the plurality of candidate natural language policy rules with the candidate attributes to generate a populated rule;
    determining if the populated rule is well-formed;
    translating the populated rule into logical access control code; and
    storing the logical access control code in a policy archive.

9. The method of claim 8, wherein the logical access control code is in XACML format.

10. The method of claim 8, wherein the logical access control code is in NGAC format.

11. The method of claim 8, wherein the attribute dictionary is populated with attributes from the natural language policy set.

12. The method of claim 8, wherein the attribute dictionary is populated by user input.

13. The method of claim 8, wherein the natural language processing comprises named entity recognition that identifies a named entity that is a string in the input free text natural language policy text strings, wherein a first natural language policy set includes metadata for the named entity from a previously translated policy.

14. The method of claim 8, wherein the natural language processing comprises morphological segmentation.

15. A non-transitory computer-readable medium comprising instructions for translating natural language policy text into logical access control policy code, the non-transitory computer-readable medium comprising instructions for:

receiving a sequence of free text natural language policy text strings input by a user to a policy composer;

using natural language processing to automatically identify a plurality of candidate attributes in the sequence of free text natural language policy text strings and store the candidate attributes in an attribute dictionary;

identifying a plurality of candidate natural language policy rules from a natural language policy set;

populating the plurality of candidate natural language policy rules with the candidate attributes to generate a populated rule;

determining if the populated rule is well-formed;

translating the populated rule into logical access control code; and storing the logical access control code in a policy archive.

16. The non-transitory computer-readable medium of claim 15, wherein the logical access control code is in XACML format.

17. The non-transitory computer-readable medium of claim 15, wherein the logical access control code is in NGAC format.

18. The non-transitory computer-readable medium of claim 15, wherein the attribute dictionary is populated with attributes from the natural language policy set.

19. The non-transitory computer-readable medium of claim 15, wherein the attribute dictionary is populated by user input.

20. The non-transitory computer-readable medium of claim 15, wherein the natural language processing comprises named entity recognition that identifies a named entity that is a string in the input free text natural language policy text strings, wherein a first natural language policy set includes metadata for the named entity from a previously translated policy.

* * * * *